(12) United States Patent
Glesius

(10) Patent No.: US 7,377,171 B2
(45) Date of Patent: May 27, 2008

(54) FEEDBACK CIRCUIT FOR RADIATION RESISTANT TRANSDUCER

(75) Inventor: Frederick Glesius, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 11/504,064

(22) Filed: Aug. 15, 2006

(65) Prior Publication Data

US 2008/0041161 A1 Feb. 21, 2008

(51) Int. Cl.
*G01N 29/00* (2006.01)
(52) U.S. Cl. .......................................... 73/649; 73/708
(58) Field of Classification Search ................ 73/649, 73/703, 708, 514.18, 862.61
See application file for complete search history.

(56) References Cited

U.S. PATENT DOCUMENTS 3,213,694 A * 10/1965 Clark et al. .............. 73/514.17
3,646,815 A * 3/1972 Martin et al. ................. 73/727
4,420,826 A * 12/1983 Marshall et al. ............ 367/167
4,793,181 A * 12/1988 Djorup ..................... 73/335.02
4,891,611 A * 1/1990 Frerking ..................... 331/158
5,299,175 A * 3/1994 Gallego-Juarez et al. ... 367/138
6,060,813 A * 5/2000 Nowak ....................... 310/314
6,530,275 B1* 3/2003 Hollocher et al. ........ 73/514.18
6,761,069 B2* 7/2004 Hollocher et al. ........ 73/514.18

* cited by examiner

*Primary Examiner*—Hezron Williams
*Assistant Examiner*—Jacques M. Saint-Surin
(74) *Attorney, Agent, or Firm*—Nixon & Vanderhye P.C.

(57) ABSTRACT

A velocity transducer or Velomitor® that can output electrical signals relating to vibration, despite the transducer being exposed to low levels of gamma-radiation, is disclosed. A DC feedback circuit, which sets up the input stage bias point, keeps the output bias voltage within a usable voltage range as the transducer is exposed to the gamma-radiation. An additional JFET transistor, configured as a current source, helps the DC feedback circuit compensate for increases in the offset voltage of the JFET amplifier. The value of a resistor controlling the gate current of the JFET amplifier is also reduced, such that when the leakage current increases, the offset voltage is reduced.

20 Claims, 5 Drawing Sheets

FEEDBACK CIRCUIT FOR RADIATION RESISTANT TRANSDUCER

The present invention relates to the monitoring of industrial machinery, such as power generating equipment, and, more particularly, to a velocity transducer capable of measuring vibrations in such machinery despite being exposed to low levels of gamma-radiation.

BACKGROUND OF THE INVENTION

Serious problems with rotating industrial equipment, such as power generating equipment, can often be avoided by monitoring various parameters of the equipment to determine whether such equipment may have an operating problem. Velomitors®[1] are one brand of velocity transducers that are used to provide protection of industrial machinery by measuring equipment vibration.

Velomitor® is a registered trademark of Bently Nevada.

Velomitors® are used in a number of environments. One application in which these transducers are used is the monitoring of equipment in nuclear plants where the transducers are continuously exposed over time to low levels of gamma-radiation. Velomitors® used in this type of environment are typically exposed to radiation over a long period of time. The exposed Velomitors® will function in this kind of environment for a period of time, but eventually the output bias voltage of these transducers shifts as they are exposed to the radiation over an extended period of time. Ultimately, the output of a transducer will drift close to one of its supply voltage levels, whereupon the transducer stops functioning. This problem arises when a junction field effect transistor ("JFET") used in the Velomitor® to form a common source amplifier stage is irradiated by the gamma-radiation. The irradiation causes increasing current leakage into the JFET's gate over time. This increase in gate current, when coupled with a large feedback resistor in series with the gate, produces a high offset voltage at the transducer's output, driving the transducer's output toward the device's rail (supply voltage).

BRIEF DESCRIPTION OF THE INVENTION

The present invention is directed to a velocity transducer that can output electrical signals relating to vibration, despite the transducer being exposed to low levels of gamma-radiation. A feedback circuit in the transducer sets up the input stage bias point. The feedback circuit keeps the output bias voltage within a usable voltage range as the transducer is exposed to the gamma-radiation. An additional JFET transistor, configured as a current source, helps to compensate for increases in the offset voltage of the JFET amplifier. In addition, the value of a resistor controlling the gate current of the JFET amplifier is reduced, such that when the gate leakage current increases, the offset voltage is reduced.

In an exemplary embodiment of the invention, a transducer for measuring vibrations which is capable of compensating for changes in the transducer's output voltage caused by radiation exposure comprises an accelerometer for generating acceleration signals in response to vibrations, an integrator for generating velocity signals by integrating the acceleration signals output by the accelerometer, the integrator comprising an amplifier, an alternating current ("AC") feedback circuit for integrating the acceleration signals input to the amplifier, and a direct current ("DC") feedback circuit for biasing the amplifier to produce a predetermined output voltage, the DC feedback circuit including a feedback resistor having a predetermined value selected to reduce by a predetermined amount changes in the output voltage of the amplifier due to increases in gate current into the amplifier resulting from the amplifier being exposed to radiation, the AC feed back circuit including a voltage divider circuit formed by first and second resistors, the voltage divider circuit applying a predetermined percentage of feedback voltage to the feedback resistor that causes the feedback resistor to have an effect in the AC feedback circuit as if the value of the feedback resistor were a predetermined multiple of the feedback resistor's actual value.

In another exemplary embodiment of the invention, a transducer for measuring vibrations which is capable of compensating for changes in the transducer's quiescent output voltage caused by radiation exposure comprises an accelerometer for generating acceleration signals in response to vibrations, an integrator for generating velocity signals by integrating the acceleration signals output by the accelerometer, the integrator comprising an operational amplifier, an alternating current ("AC") feedback circuit for integrating the acceleration signals input to the amplifier, and a direct current ("DC") feedback circuit for biasing the amplifier to produce a predetermined quiescent output voltage, the DC feedback circuit including a feedback resistor connected to operational amplifier's input, the feedback resistor having a predetermined value selected to reduce by a predetermined amount changes in the quiescent output voltage of the amplifier due to increases in gate current into the amplifier resulting from the amplifier being exposed to radiation, the AC feed back circuit including a voltage divider circuit formed by first and second resistors, the feedback resistor being connected between the voltage divider circuit and the amplifier's input, wherein the voltage divider circuit applying a predetermined percentage of feedback voltage to the feedback resistor that causes the feedback resistor to have an effect in the AC feedback circuit as if the value of the feedback resistor were a predetermined multiple of the feedback resistor's actual value.

In yet another exemplary embodiment of the invention, a transducer for measuring vibrations which is capable of compensating for changes in the transducer's quiescent output voltage caused by radiation exposure comprises an accelerometer for generating acceleration signals in response to vibrations, an integrator for generating velocity signals by integrating the acceleration signals output by the accelerometer, the integrator comprising a junction field effect transistor ("JFET") amplifier, an alternating current ("AC") feedback circuit for integrating the acceleration signals, and a direct current ("DC") feedback circuit for biasing the amplifier to produce a predetermined quiescent output voltage, the DC feed back circuit including a feedback resistor connected to JFET amplifier's input, the feedback resistor having a predetermined value selected to reduce by a predetermined amount changes in the quiescent output voltage due to increases in gate current into the JFET amplifier resulting from the JFET amplifier being exposed to radiation, the AC feed back circuit including a voltage divider circuit formed by first and second resistors, the feedback resistor being connected between the voltage divider circuit and the JFET amplifier's input, wherein the voltage divider circuit applies a predetermined percentage of feedback voltage to the feedback resistor that causes the feedback resistor to function as if the value of the feedback resistor were a predetermined multiple of the feedback resistor's actual value.

DETAILED DESCRIPTION OF THE INVENTION

The present invention is directed to a velocity transducer that provides electrical measurements relating to vibration despite being exposed to low levels of gamma-radiation.

Figure 1:
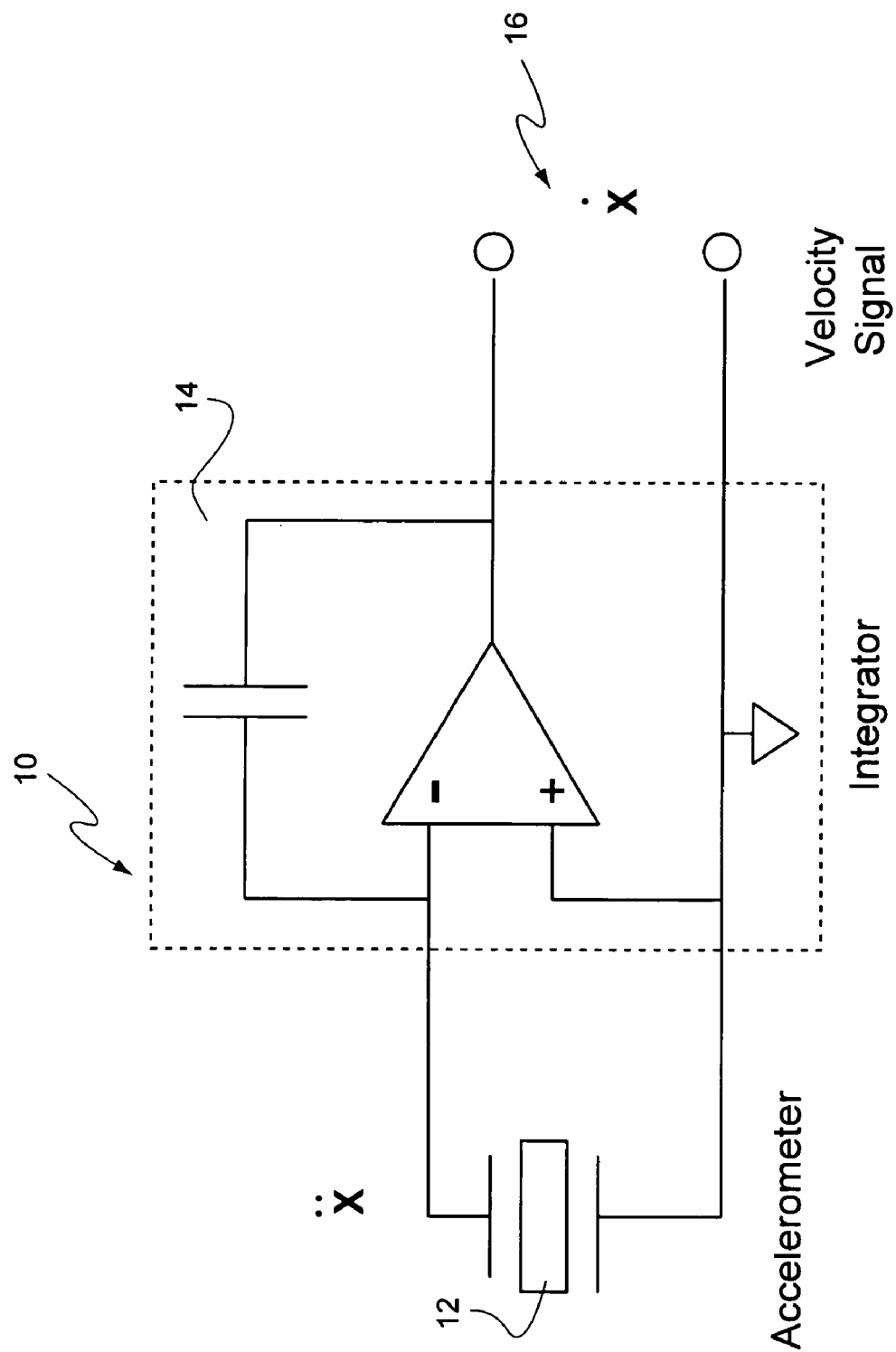
FIG. 1 is a conceptual schematic diagram for a basic velocity transducer.

FIG. 1 shows a conceptual schematic of a velocity transducer or Velomitor® 10 that is used to measure vibration of industrial equipment in an environment in which the equipment is subjected to low levels of gamma-radiation. The velocity transducer 10 includes an accelerometer 12 preferably in the form of a piezoelectric crystal, which produces electrical acceleration signals caused by a squeezing of the crystal due to vibrations. The velocity transducer 10 also includes an integrator 14 that integrates the acceleration signals output by accelerometer 12 so as to produce a velocity signal at the output of transducer 10.

The operating characteristics of transducer 10 are typically as follows: (1) a bandwidth for measuring vibration frequencies ranging from 4 Hz to 5 kHz; (2) a response range for measuring vibrations of 0 to 50 inches per second; (3) a temperature operating range of –55° C. to 121° C.; and (4) acceptable bias drift after a total dose of 3 Mrads, maximum, giving a life expectancy of about four years.

Figure 2:
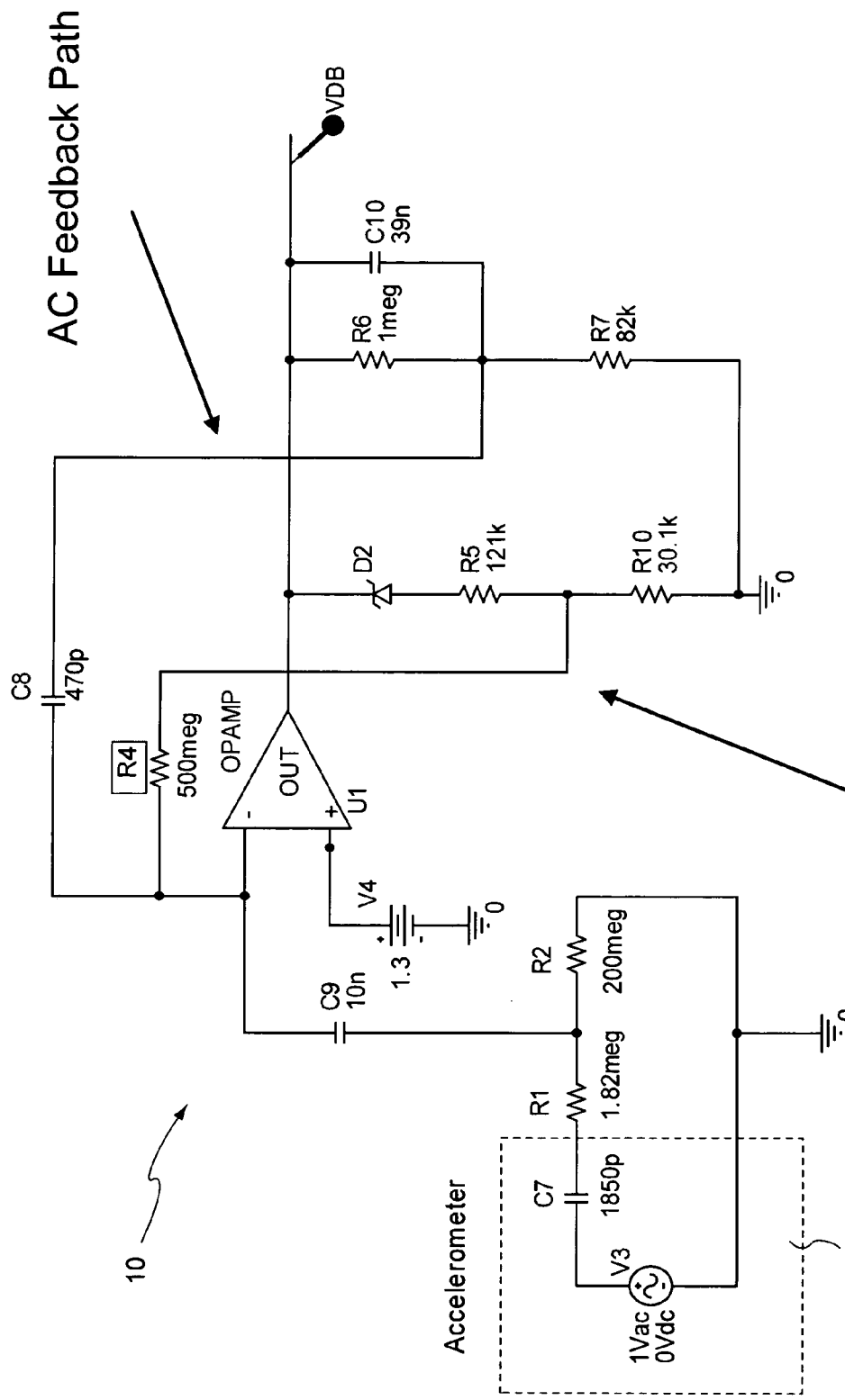
FIG. 2 is a simplified schematic diagram for the basic velocity transducer of FIG. 1.

FIG. 2 is a simplified schematic of the velocity transducer 10 shown in FIG. 1. The accelerometer 12 is depicted in the schematic of FIG. 2 as being comprised of a variable voltage source V3, providing a direct current ("DC") output voltage of 0V and an alternating current ("AC") or variable signal output voltage of 1V, peak to peak, and a capacitor C7 having a value of approximately 1,850 pf. The integrator 14 is depicted in the schematic of FIG. 2 as being comprised of an operational amplifier U1 including both AC and DC feedback circuits. Before being affected by gamma radiation, integrator 14 produces a quiescent DC output bias voltage of about 12V.

The DC feedback circuit of integrator 14 is comprised of a 5V zener diode D2, a second voltage divider circuit consisting of resistors R5 and R10, and a third, very large resistor R4 having a value of 500 megohms and being connected between the voltage divider and the negative input of operational amplifier U1. This DC feedback circuit is designed to apply a DC bias voltage of about 1.3V to the negative input of op operational amplifier U1. Similarly, a voltage source V4 applies a DC bias voltage of about 1.3V DC to the positive input of operational amplifier U1.

The variable signal output voltage from accelerometer 12 is applied to a voltage divider comprised of resistors R1 and R2. The portion of the variable signal output voltage across the second resistor, R2, is input to the negative input of operational amplifier U1 of integrator 14 through a capacitor C9 during conditions of equipment vibration.

Integrator 14 includes an AC feedback circuit that functions during conditions of equipment vibration when the accelerometer 12 is outputting a variable signal. The AC feedback circuit of integrator 14 includes a voltage divider consisting of resistors R6 and R7, and a feedback capacitor C8 connected between the voltage divider and the negative input of operational amplifier U1. Capacitor C8 has a value of 470 pf.

The low frequency bandwidth of velocity transducer 10 is achieved through the use of large values for feedback resistor R4 and feedback capacitor C8. These large values allow transducer 10 to measure vibrations having frequencies within a very low frequency range, i.e., the 4 Hz to 5 kHz frequency range noted above.

Figure 3:
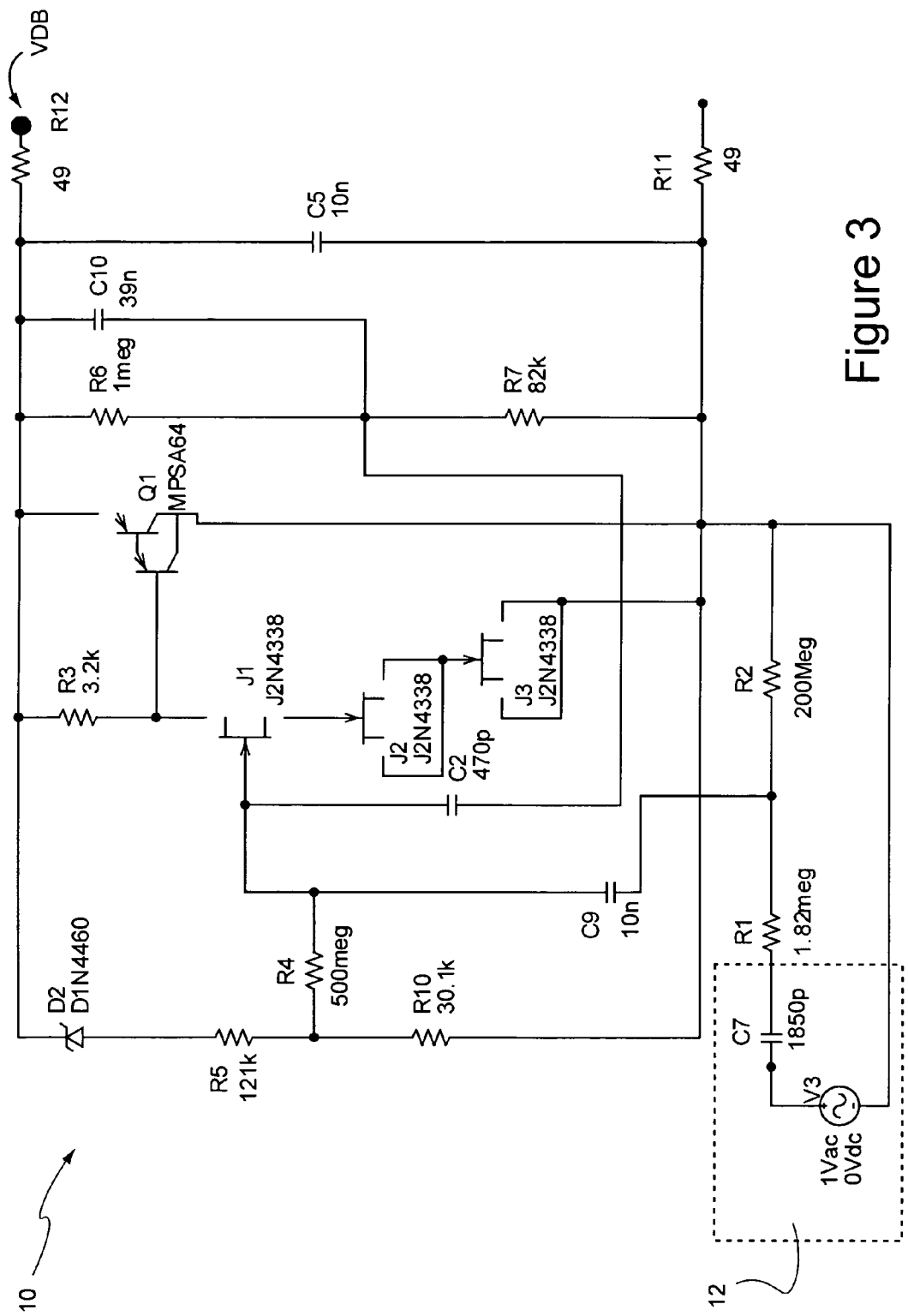
FIG. 3 is a more detailed circuit schematic of the simplified schematic shown in FIG. 2.

FIG. 3 shows a more detailed circuit schematic for the simplified circuit schematic shown in FIG. 2. In FIG. 3, accelerometer 12 is again depicted as being comprised of variable voltage source V3 and capacitor C7. In addition, the output signal from accelerometer 12 is again shown as being split between the voltage divider formed by resistors R1 and R2.

The schematic of FIG. 3 also includes a first JFET transistor, J1, whose gate corresponds to the negative input of the operational amplifier U1 shown in FIG. 2. JFET J1 is part of a common source amplifier stage. The source of JFET J1 is biased at approximately 1.3V by two JFET transistors, J2 and J3, that are each wired as a diode with a voltage drop of approximately 0.65V each. The output of accelerometer 12 is again fed to the gate of transistor J1 through capacitor C9. The DC feedback is again provided by zener diode D2 and resistors R5 and R4, also shown in the schematic of FIG. 3. The drain of JFET J1 is connected to a PNP Darlington amplifier, Q1.

The circuit arrangement shown in FIG. 3 produces a quiescent output of about 12 volts at the output terminal VDB connected to resistor R10. The problem with the circuit of FIG. 3 results from the circuit being exposed to the gamma-radiation that is present in the environment in which transducer 10 must operate. When transducer 10 is new, the gate current into JFET J1 is substantially zero. This produces a quiescent output voltage of 12 volts at the terminal VDB connected to resistor R10. In time, however, as JFET J1 is exposed to the gamma-radiation, the gate current, Ig, into the gate of JFET J1 increases linearly over time with the radiation dose to which J1 is exposed. As the gate current increases, the quiescent output voltage of transducer 10 decreases to compensate for the increased gate current, Ig, by "bleeding off" the increased gate current through feedback resistor R4, which has a large resistance value of 500 megohms. After approximately 50 days, the increased gate current flowing into J1 decreases the quiescent output bias voltage of velocity transducer 10 by approximately 3 volts. For each 50 days thereafter, the output voltage of velocity transducer 10 decreases by approximately 3 volts until, ultimately, it approaches zero, so that the device no longer functions to provide any vibration measurements. The difficulty presented by this change in output voltage is compounded by the fact that the affected transducer 10 can not be readily replaced for a period of at least a year to two years, since the plants in which transducer 10 is typically located are sealed and operated for such period without access to them due to the radiation to which they are exposed.

Figure 4:
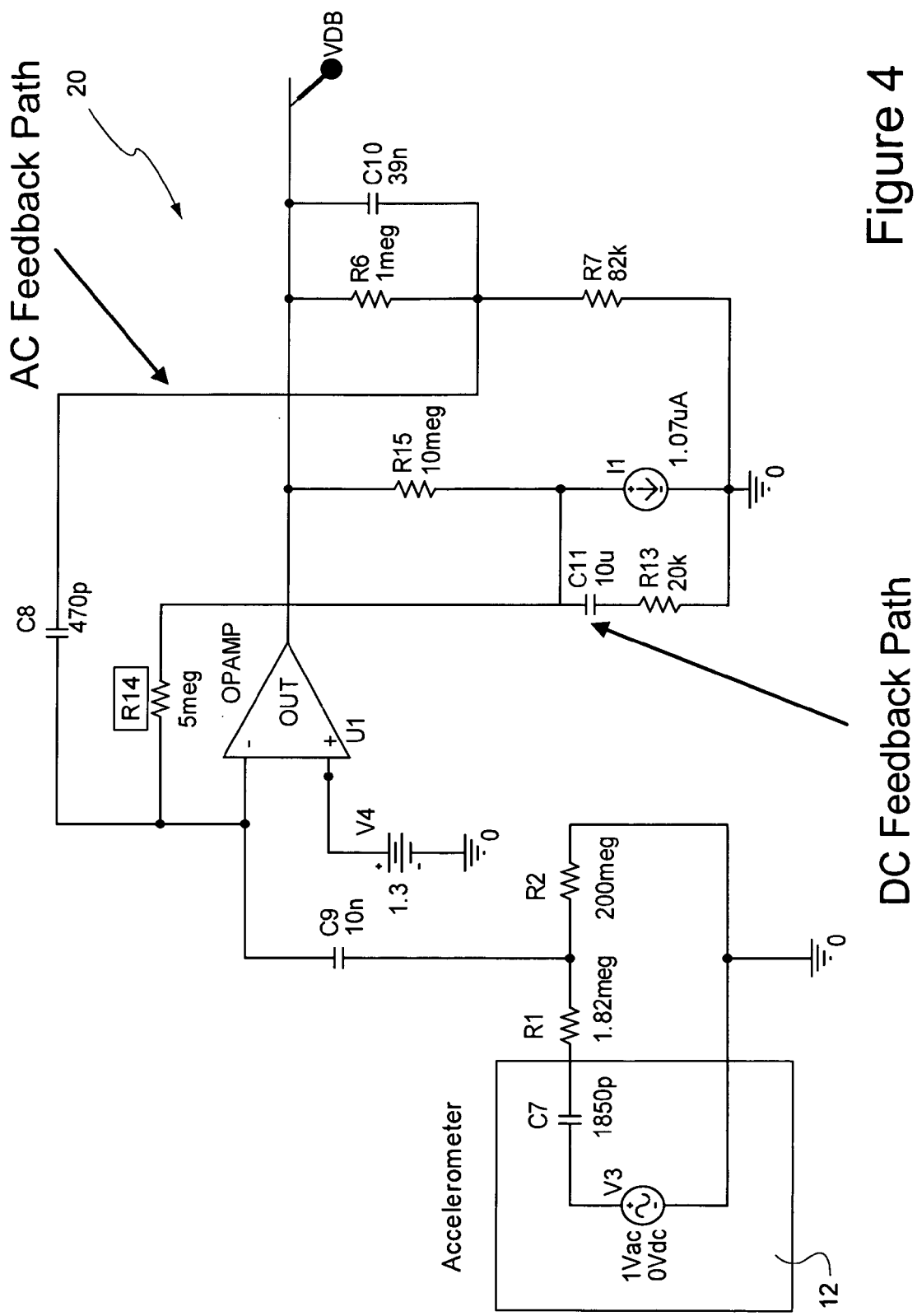
FIG. 4 is a simplified schematic diagram of a radiation resistant velocity transducer according to the present invention.
Figure 5:
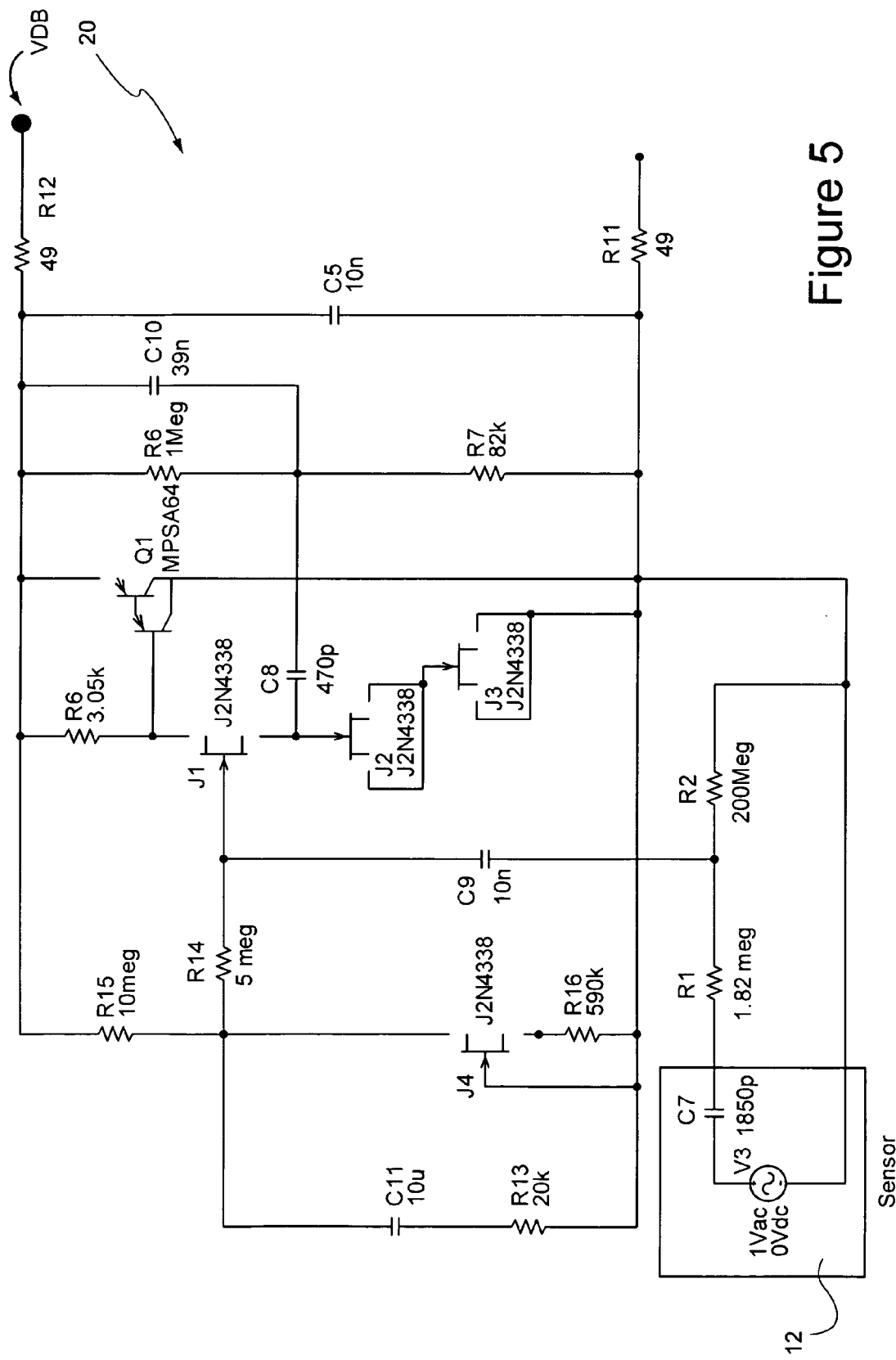
FIG. 5 is a more detailed circuit schematic of the simplified schematic shown in FIG. 4.

FIG. 4 shows a simplified schematic of one embodiment of a radiation resistant velocity transducer 20 according to the present invention, while FIG. 5 shows a more detailed circuit schematic for the transducer 20 of FIG. 4. Circuit components shown in FIGS. 4 and 5, which are identical to those circuit components shown in FIGS. 2 and 3, bear the same identifying notations. Thus, for example, the accelerometer 12 is again depicted in FIGS. 4 and 5 as being comprised of the variable voltage source V3 and capacitor C7, with the variable signal output of the accelerometer 12 being divided between resistors R1 and R2. The divided voltage signal from accelerometer 12 is again input to the operational amplifier U1 or JFET J1 through capacitor C9. The AC feedback circuit in the schematic of FIG. 4 is like that shown in the schematic of FIG. 2.

The DC feedback circuit used in the circuit of FIGS. 4 and 5 is different from the DC feedback circuit used in the circuit of FIGS. 2 and 3. The DC feedback circuit of FIGS. 4 and 5 includes a feedback resistor R14, which has a value of 5 megohms, a value that is 100 times less than the 500 megohm value of resistor R4, which R14 replaces. Because resistor R14 is 100 times less in value than the value of resistor R4, the circuit of FIGS. 4 and 5 is less susceptible to the effects of the gamma-radiation over time on JFET J1 shown in FIG. 5. Like in the circuit of FIG. 2, as JFET J1 is exposed to the gamma-radiation, its gate current, Ig, increases linearly over time. However, because the 5 megohm value R14 is substantially less than the 500 megohm value of original resistor R4, the effect of increases in gate current Ig on the output of transducer 20 is substantially less. As the gate current Ig increases, the output offset voltage of transducer 20 will again decrease to compensate for the increased gate current, Ig, by "bleeding off" the increased gate current through feedback resistor R14; but, because R14 has a resistance value of 5 megohms, which is 100 times smaller than the 500 megohm value of R4, the change in the quiescent output voltage will be substantially less. For example, where the output of transducer 10 was 3V after 50 days of radiation exposure, the change in the output of transducer 20 would be 30 mV after 50 days of radiation exposure.

Resistor R13 is "transparent" to the DC feedback circuit shown in FIGS. 4 and 5 because it is isolated by capacitor C11. However, when the accelerometer 12 begins to produce variable output signals because of its sensing of vibrations, capacitor C11 effectively becomes a short circuit with respect to such variable signals. As such, the variable signal voltage at the output of operational amplifier U1 sees a voltage divider between R15 and R13, with only a small fraction of preferably about 0.2% being applied across resistor R13. Feedback resistor R14 is connected between this voltage divider and the negative input to operational amplifier U1. The effect of the reduction in voltage applied to R14 by the voltage divider produces causes resistor R14 to have an effect in the DC feedback circuit that is the same as if the value of resistor R14 were the 500 megohm value of original resistor R4. It is as though the 5 megohm value of R14 is multiplied by 100. As such, transducer 20 provides a bandwidth for sensing vibrations between 4 Hz and 5 kHz, as in the original circuit for transducer 10 shown in FIGS. 2 and 3.

The DC feedback circuit of FIGS. 4 and 5 also includes a resistor R15, preferably having a value of 10 megohms, and a current source I1. Preferably current source I1 draws a current of about 1.07 µA through resistor R15 to produce a voltage drop of about 10.7 volts across resistor R15, to thereby provide a voltage of about 1.3V that is applied to the negative input of operational amplifier U1 through resistor R14.

As noted above, FIG. 5 shows a more detailed circuit schematic for the radiation resistant velocity transducer 20.

Here again, the accelerometer 12 is comprised of variable voltage source V3 and capacitor C7, while the variable output voltage of accelerometer 12 is divided between voltage divider resistors R1 and R2.

The circuit schematic of FIG. 5 also includes JFET J1, whose gate again corresponds to the negative input of operational amplifier U1 shown in FIG. 4, and JFETs J2 and J3, which function as diodes to provide the biasing of JFET J1 between its gate and source. The variable voltage output of accelerometer 12 is again fed to the gate of J1 through capacitor C9, and the drain of J1 is again connected to Darlington amplifier, Q1.

The function of current source I1 in the DC feedback circuit shown in FIG. 4 is performed by a fourth JFET transistor J4, which, as shown in FIG. 5, is connected so as to function as a current source. The other components of the DC feedback circuit, i.e., resistors R15 and R14, are also shown in FIG. 5 as being connected in the same manner as that shown in FIG. 4 with respect to the current source I1, now depicted as JFET J4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transducer for measuring vibrations which is capable of compensating for changes in the transducer's output voltage caused by radiation exposure, the transducer comprising:

an accelerometer for generating acceleration signals in response to vibrations, an integrator for generating velocity signals by integrating the acceleration signals output by the accelerometer, the integrator comprising:

an amplifier, an alternating current ("AC") feedback circuit for integrating the acceleration signals input to the amplifier, and a direct current ("DC") feedback circuit for biasing the amplifier to produce a predetermined output voltage, the DC feedback circuit including a feedback resistor having a predetermined value selected to reduce by a predetermined amount changes in the output voltage of the amplifier due to increases in gate current into the amplifier resulting from the amplifier being exposed to radiation, the AC feed back circuit including a voltage divider circuit formed by first and second resistors, the voltage divider circuit applying a predetermined percentage of feedback voltage to the feedback resistor that causes the feedback resistor to have an effect in the AC feedback circuit as if the value of the feedback resistor were a predetermined multiple of the feedback resistor's actual value.

2. The transducer of claim 1, wherein the accelerometer is a piezoelectric crystal.

3. The transducer of claim 1, wherein the amplifier includes a junction field effect transistor ("JFET") whose gate current is increased when exposed to radiation over time.

4. The transducer of claim 1, wherein the feedback resistor has a value of 5 megohms.

5. The transducer of claim 1, wherein the predetermined multiple of the feedback resistor's actual value is 100.

6. The transducer of claim 1, wherein the AC feedback circuit includes a feedback capacitor for integrating the acceleration signals.

7. The transducer of claim 1, wherein the DC feed back circuit includes a current source for drawing a predetermined current through the first resistor to thereby apply a predetermined biasing voltage to an input of amplifier through the feedback resistor.

8. The transducer of claim 7, wherein the first resistor has a value of about 10 megohms.

9. The transducer of claim 8, wherein the current source draws a current of about 1.07 µA through the first resistor to apply the predetermined biasing voltage to the amplifier.

10. The transducer of claim 1, wherein the transducer has a bandwidth for sensing vibrations of between 4 Hz and 5 kHz.

11. The transducer of claim 1, wherein the AC feed back circuit includes a second voltage divider that causes a predetermined fraction of a variable signal voltage at the output of the operational amplifier to be applied to the feedback resistor.

12. The transducer of claim 1, wherein the predetermined fraction is about 0.2%.

13. A transducer for measuring vibrations which is capable of compensating for changes in the transducer's quiescent output voltage caused by radiation exposure, the transducer comprising:
an accelerometer for generating acceleration signals in response to vibrations,
an integrator for generating velocity signals by integrating the acceleration signals output by the accelerometer, the integrator comprising:
an operational amplifier,
an alternating current ("AC") feedback circuit for integrating the acceleration signals input to the amplifier, and
a direct current ("DC") feedback circuit for biasing the amplifier to produce a predetermined quiescent output voltage,
the DC feedback circuit including a feedback resistor connected to operational amplifier's input, the feedback resistor having a predetermined value selected to reduce by a predetermined amount changes in the quiescent output voltage of the amplifier due to increases in gate current into the amplifier resulting from the amplifier being exposed to radiation,
the AC feed back circuit including a voltage divider circuit formed by first and second resistors, the feedback resistor being connected between the voltage divider circuit and the amplifier's input, wherein the voltage divider circuit applying a predetermined percentage of feedback voltage to the feedback resistor that causes the feedback resistor to have an effect in the AC feedback circuit as if the value of the feedback resistor were a predetermined multiple of the feedback resistor's actual value.

14. The transducer of claim 13, wherein the accelerometer is a piezoelectric crystal.

15. The transducer of claim 13, wherein the operational amplifier includes a junction field effect transistor ("JFET") input device whose gate current is increased when exposed to radiation over time.

16. The transducer of claim 13, wherein the feedback resistor has a value of 5 megohms.

17. The transducer of claim 13, wherein the predetermined multiple of the feedback resistor's actual value is 100.

18. The transducer of claim 13, wherein the DC feed back circuit includes a current source for drawing a predetermined current through the first resistor to thereby apply a predetermined biasing voltage to a negative input of operational amplifier through the feedback resistor.

19. The transducer of claim 13, wherein the AC feed back circuit includes a second voltage divider that causes a predetermined fraction of a variable signal voltage at the output of the operational amplifier to be applied to the feedback resistor.

20. A transducer for measuring vibrations which is capable of compensating for changes in the transducer's quiescent output voltage caused by radiation exposure, the transducer comprising:
an accelerometer for generating acceleration signals in response to vibrations,
an integrator for generating velocity signals by integrating the acceleration signals output by the accelerometer, the integrator comprising:
a junction field effect transistor ("JFET") amplifier,
an alternating current ("AC") feedback circuit for integrating the acceleration signals, and
a direct current ("DC") feedback circuit for biasing the amplifier to produce a predetermined quiescent output voltage,
the DC feed back circuit including a feedback resistor connected to JFET amplifier's input, the feedback resistor having a predetermined value selected to reduce by a predetermined amount changes in the quiescent output voltage due to increases in gate current into the JFET amplifier resulting from the JFET amplifier being exposed to radiation,
the AC feed back circuit including a voltage divider circuit formed by first and second resistors, the feedback resistor being connected between the voltage divider circuit and the JFET amplifier's input, wherein the voltage divider circuit applies a predetermined percentage of feedback voltage to the feedback resistor that causes the feedback resistor to function as if the value of the feedback resistor were a predetermined multiple of the feedback resistor's actual value.

* * * * *